(12) United States Patent
Visser et al.

(10) Patent No.: US 10,779,486 B2
(45) Date of Patent: Sep. 22, 2020

(54) PLANT POT WICK INSERTION HARDWARE AND METHOD

(71) Applicants: Anthony Visser, Miami, FL (US); Michael K. Rimland, Miami, FL (US)

(72) Inventors: Anthony Visser, Miami, FL (US); Michael K. Rimland, Miami, FL (US)

(73) Assignee: Costa Farms, LLC, Miami, FL (US)

( * ) Notice: Subject to any disclaimer, the term of this patent is extended or adjusted under 35 U.S.C. 154(b) by 88 days.

(21) Appl. No.: 15/419,715

(22) Filed: Jan. 30, 2017

(65) Prior Publication Data

US 2017/0215356 A1    Aug. 3, 2017

Related U.S. Application Data

(60) Provisional application No. 62/288,617, filed on Jan. 29, 2016.

(51) Int. Cl.
  *A01G 27/00* (2006.01)
  *A01G 27/06* (2006.01)

(52) U.S. Cl.
  CPC .................. *A01G 27/06* (2013.01)

(58) Field of Classification Search
  CPC ........ A01G 9/122; A01G 9/124; A01G 9/128; A01G 13/0293; A01G 27/04; A01G 27/06; A01G 27/00
  USPC ................. 47/81, 48.5, 79; 292/10
  See application file for complete search history.

(56) References Cited

U.S. PATENT DOCUMENTS

| | | | | |
|---|---|---|---|---|
| 235,516 A | * | 12/1880 | Conway ................ | A01G 27/04 47/81 |
| 414,635 A | * | 11/1889 | Gardner ................ | G09F 3/0352 292/307 R |
| 4,389,815 A | * | 6/1983 | English ................ | A01G 27/04 47/79 |
| 4,483,098 A | * | 11/1984 | Anderson ............. | A01G 9/128 47/44 |
| 4,932,159 A | * | 6/1990 | Holtkamp, Sr. ....... | A01G 27/04 47/81 |
| 5,193,305 A | * | 3/1993 | Holtkamp, Jr. ........ | A01G 27/04 47/81 |
| 6,145,249 A | * | 11/2000 | Boling ................. | A01G 27/04 47/79 |
| 7,434,360 B2 | * | 10/2008 | Traub ................... | A01G 9/28 52/102 |
| 2001/0034971 A1 | * | 11/2001 | Walsh .................. | A01G 20/30 47/48.5 |

FOREIGN PATENT DOCUMENTS

| FR | 2637156 A1 | * | 4/1990 | ............ A01G 27/04 |
|---|---|---|---|---|
| WO | WO-2016116262 A1 | * | 7/2016 | ............ A01G 27/04 |

* cited by examiner

*Primary Examiner* — Christopher D Hutchens
(74) *Attorney, Agent, or Firm* — J. Wiley Horton

(57) ABSTRACT

A device and method for inserting a wick in a plant pot and retaining the wick in a desired position. A wick retainer is provided. This device very generally resembles a large nail, having a head at its first end and an elongated column extending therefrom. The far end of the column opens into a retention notch configured to secure a wick at any point along its length. A unidirectional latch is located proximate the head. The head also contains one or more receivers configured to retain the free ends of the wick.

8 Claims, 13 Drawing Sheets

PLANT POT WICK INSERTION HARDWARE AND METHOD

CROSS-REFERENCES TO RELATED APPLICATIONS

Pursuant to the provisions of 37 C.F.R. section 1.53(c), this non-provisional patent application claims the benefit of provisional application Ser. No. 62/288,617. The provisional application was filed on Jan. 29, 2016. It listed the same inventors.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of horticulture. More specifically, the invention comprises a system and method for inserting an irrigation wick in a plant pot and retaining it in position.

2. Description of the Related Art

Irrigating wicks are used in a wide variety of plant pots. The wicks provide a steady supply of moisture to the plant-growing media within the pot, while minimizing the risk of over-watering. A portion of the wick must contact a liquid source (such as a reservoir) and a portion must lie within the pot. There are many different types of pots and reservoirs used in wick-based systems. FIGS. 1-5 illustrate one known system. The components of this system should properly be viewed as exemplary. Many, many other configurations are known in the industry.

FIG. 1 shows plant pot 12 and container 10. These are sized to create a "nested" assembly where plant pot 12 lies within container 10. Top flange 14 of the plant pot will rest proximate the upper rim of container 10. Plant pot 12 contains potting soil (or some other suitable growth media) and the pant or plants to be grown. Container 10 includes a water reservoir, as will be seen.

FIG. 2 shows the same components sectioned in half to reveal internal details. The plant pot includes bottom 18 joined to tapered side wall 16. Side wall 16 includes step 26 leading to an upper portion having a larger diameter. Top flange 14 extends around the upper periphery of the side wall. Central portion 22 is raised with respect to the rest of the bottom. Multiple ribs 24 connect central portion 22 to side wall 16. These serve to stiffen the bottom of the pot. One or more holes 20 pass through bottom 18.

Container 10 also includes a bottom 28 joined to tapered side wall 34. Central tower 30 extends upward from bottom 28. Support ring 32 is located on the upper portion of central tower 30. FIG. 3 illustrates how plant pot 12 is configured to nest within container 10. Central portion 22 of the plant pot rests on support ring 32. At the same time, top flange 14 is a close sliding fit within the interior surface of side wall 34. Those skilled in the art will realize that plant pot 12 is thereby securely retained within container 10 in a stable configuration.

Annular reservoir 36 is formed in the lower portion of the container. The reservoir is an annular volume created by the gap between central tower 30 and side wall 34. A liquid such as water can be stored within annular reservoir 36.

FIG. 5 shows a bottom view of the exemplary plant pot. This version includes four holes 20 passing through bottom 18. The reader will observe how ribs 24 interrupt the planar surface of the bottom. The location of ribs 24 and central portion 22 often dictate the location for holes 20. As those skilled in the art will know, the various plant pots on the market include a wide variety of hole sizes. They are not standardized.

FIG. 4 shows the assembly of the plant pot and container in use for growing a plant. Media. 38 is contained within the plant pot. One or more plants 40 are grown within the media. Water 44 is placed within the reservoir in the container. Wick 42 is passed through a hole 20 in the bottom of the plant pot. The lower portion of the wick is wetted by the water in the reservoir. The wick then transports the water up into the media within the pot. In many prior art examples the wick will not be doubled over as shown but will instead be a single length.

Some known pot/container assemblies have a filler tube or channel that allows the user to refill the reservoir. The version shown in FIG. 4 does not have this feature. Instead, the user pours water into the media in the conventional way. If too much water is added, however, it exits the plant pot through holes 20 and accumulates in the reservoir. The water is then slowly wicked back up into the plant pot. Such a system allows a user to water much less frequently. A relatively large amount of water may be added in order to fill the reservoir. The wick system then meters the water into the pot.

Of course, it is still possible to over-water by flooding the reservoir and then flooding the pot. Some pot/container systems have visual indicators that allow the user to see when the reservoir is full. Others simply have a reservoir overflow outlet. In any event, it is important to insert the wick roughly into the position shown in FIG. 4 and equally important for the wick to remain at least approximately in that position. The present invention provides a device and method for inserting and retaining the wick in a suitable position.

BRIEF SUMMARY OF THE PRESENT INVENTION

The present invention comprises a device and method for inserting a wick in a plant pot and retaining the wick in a desired position. A wick retainer is provided. This device very generally resembles a large nail, having a head at its first end and an elongated column extending therefrom. The far end of the column opens into a retention notch configured to secure a wick at any point along its length. A unidirectional latch is provided near the head. The unidirectional latch allows the wick retainer to be pressed through a hole into the plant pot but resists its removal. In one embodiment a pair of flex arms is connected to the column proximate the head. Each flex arm has a linear array of teeth. The teeth are configured to engage the perimeter of an opening in the bottom of a plant pot. The collapsible nature of the flex arms allows the teeth to successfully engage a wide range of opening sizes.

In operation a user inserts a portion of a wick into the retention notch proximate the far end of the column. The column is then passed through a hole in the bottom of a plant pot so that the column and a portion of the wick lie within the plant pot. The teeth on the two flex arms engage the sides of the hole and secure the assembly in position. In an alternate embodiment, only a single flex arm may be used.

A receiver is provided on each side of the head. These receivers receive and retain the free ends of the wick so that they do not snag on the edges of the hole as the wick retainer is inserted.

Figure 1:
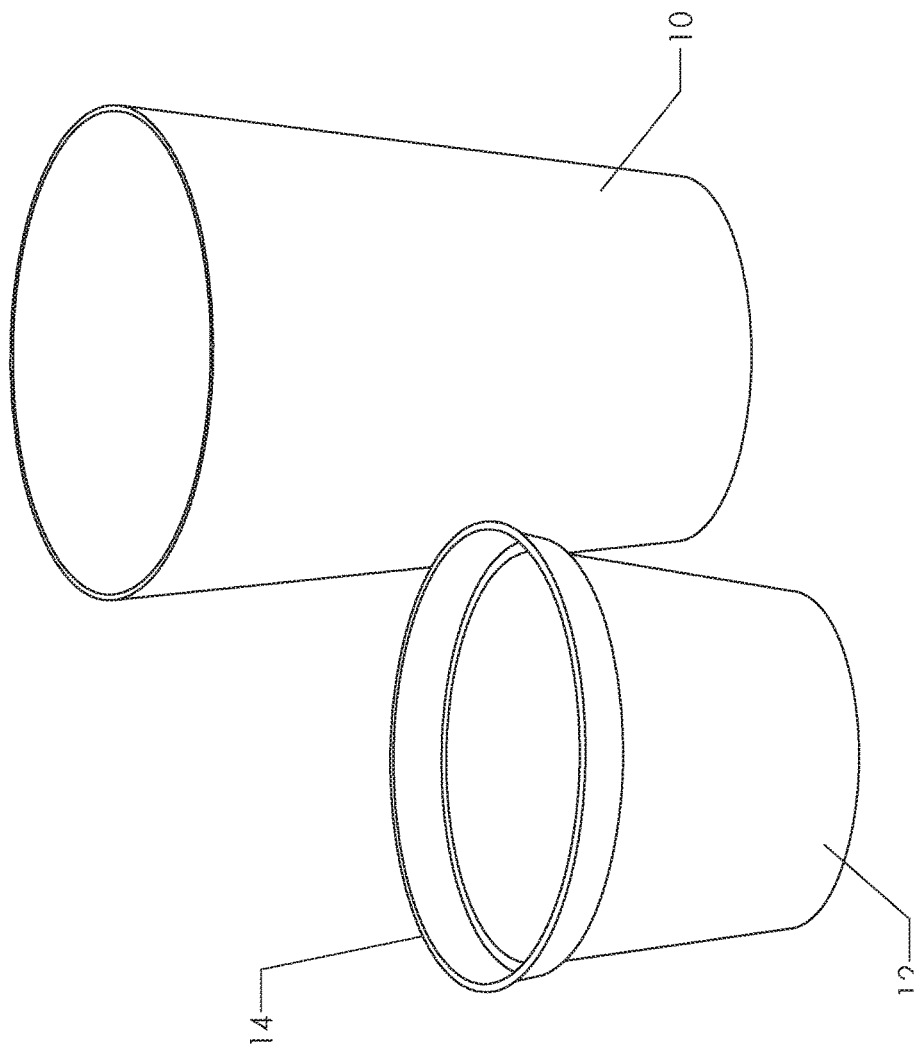
FIG. 1 is a perspective view, showing a prior art plant pot and container.
Figure 2:
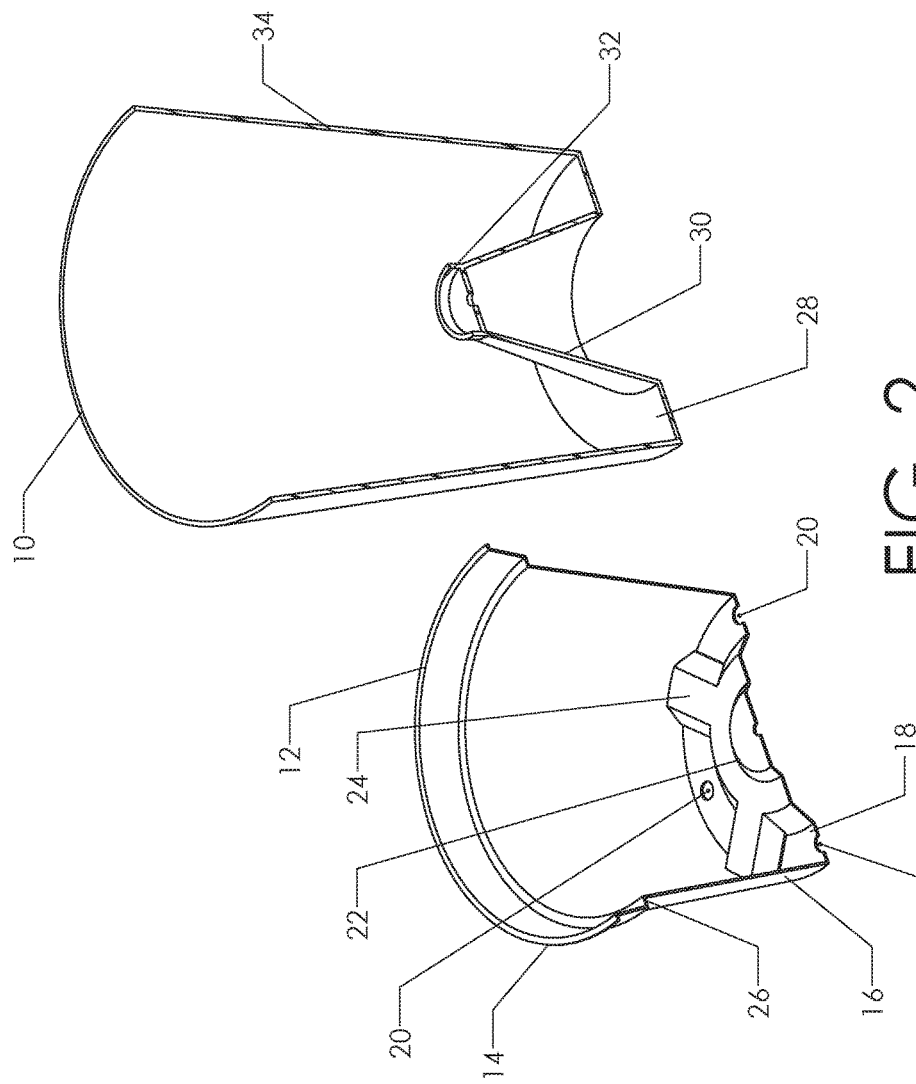
FIG. 2 is a sectioned perspective view, showing the plant pot and container of FIG. 1 sectioned in half to reveal internal details.
Figure 3:
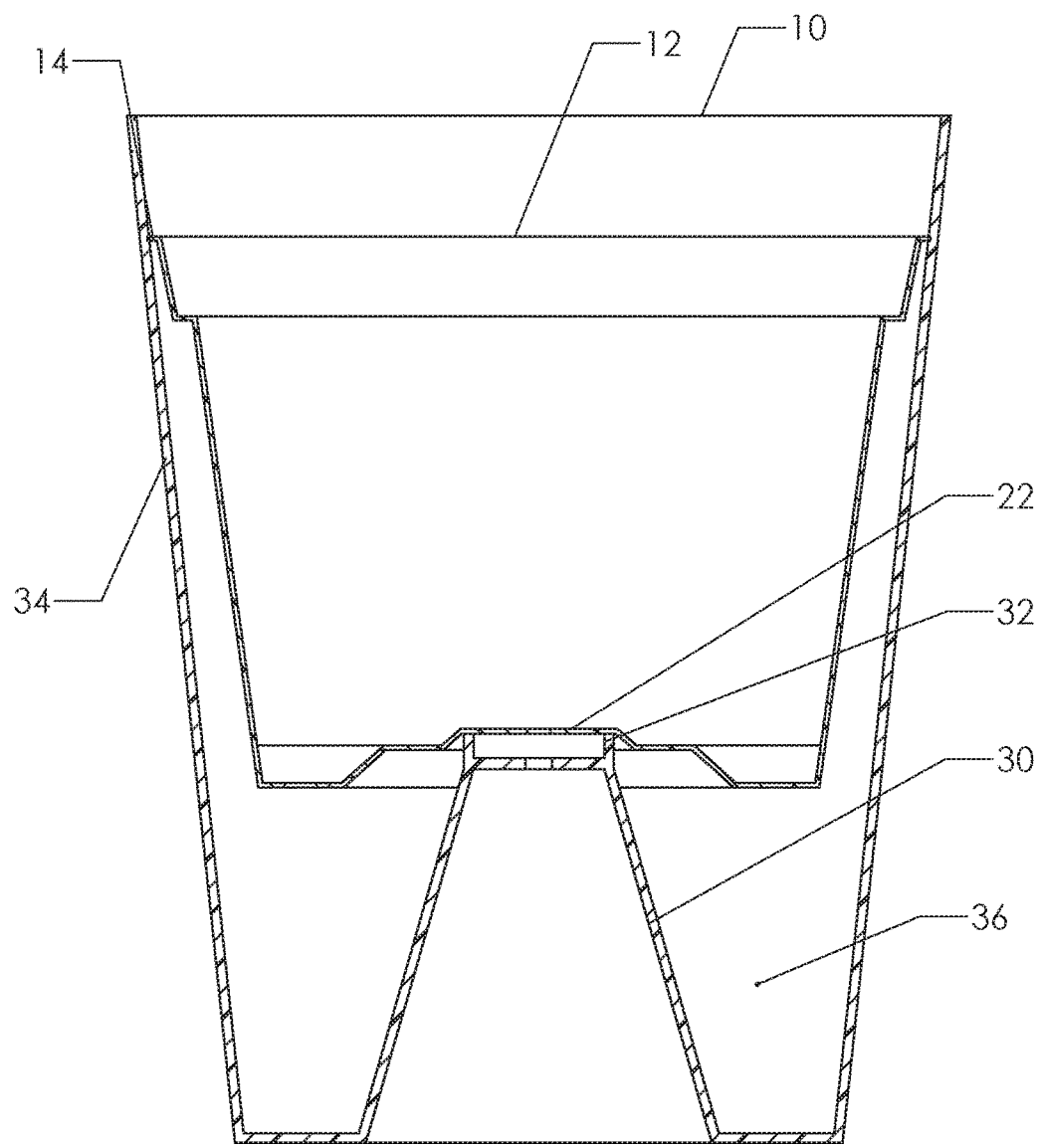
FIG. 3 is a sectioned elevation view, showing the plant pot and container of FIG. 1 nested together as they would be in use.
Figure 4:
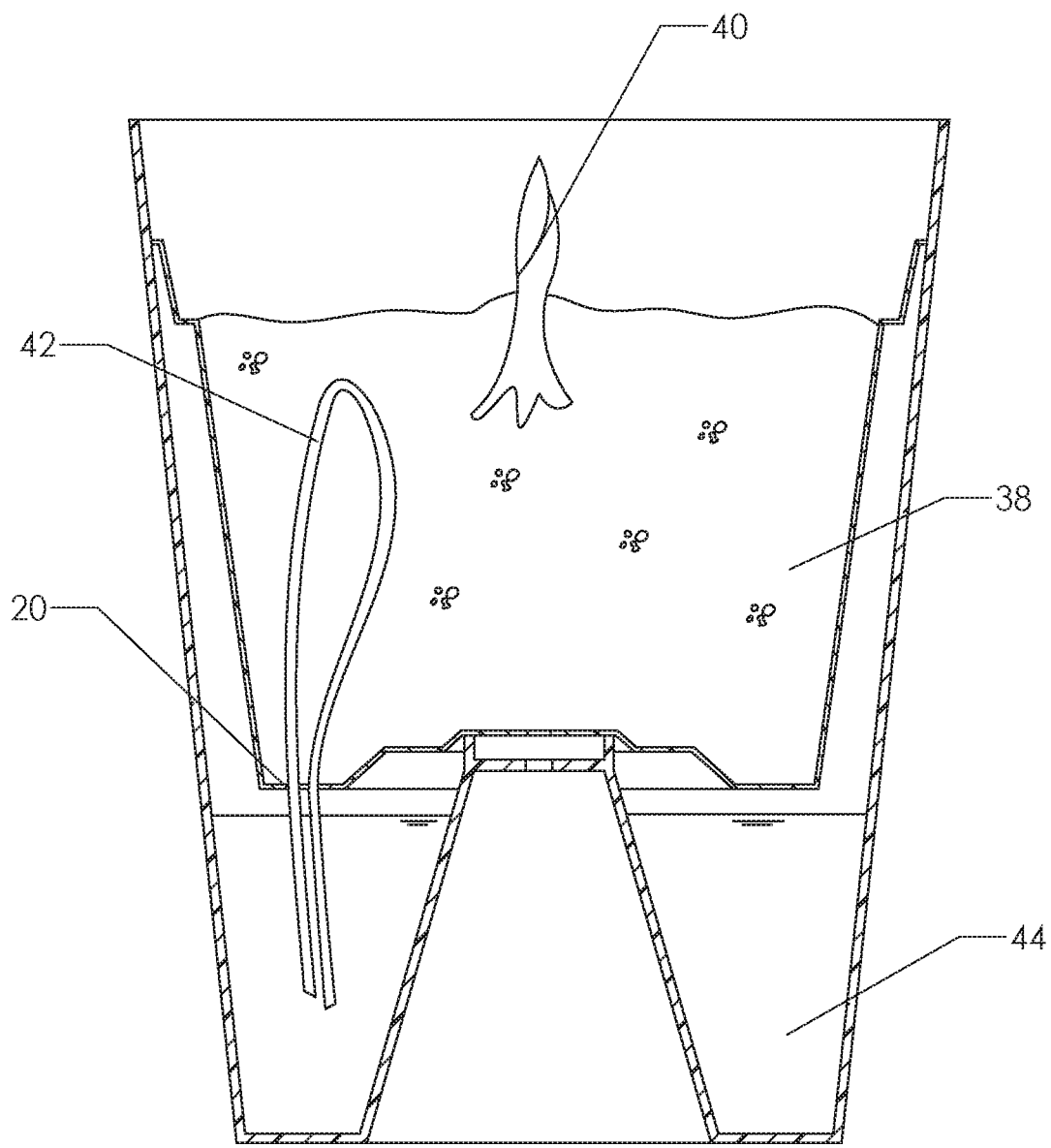
FIG. 4 is a sectioned elevation view, showing a complete assembly with potting media, a plant, and a wick added.
Figure 5:
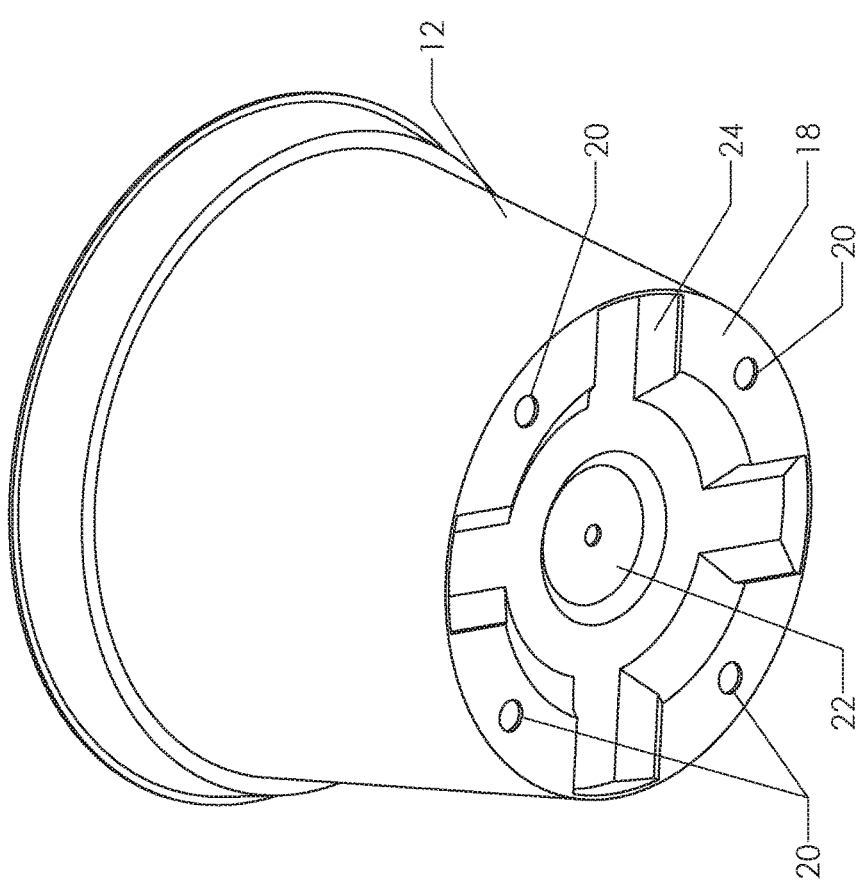
FIG. 5 is a perspective view, showing the bottom of the plant pot.

REFERENCE NUMERALS IN THE DRAWINGS 10 container
12 plant pot
14 top flange
16 side wall
18 bottom
20 hole
22 central portion
24 rib
26 step
28 bottom
30 central tower
32 support ring
34 side wall
36 annular reservoir
38 media
40 plant
42 wick
44 water
46 wick retainer
48 head
50 column
52 first flex arm
54 second flex arm
56 rib
58 retention notch
60 expanding inlet
62 chamfer
64 flexible joint
66 tooth
68 tapered surface
70 retention surface
72 upper surface
74 lower surface
76 notch
78 receiver
80 encircling arm
82 gap

DETAILED DESCRIPTION OF THE INVENTION

Figure 6:
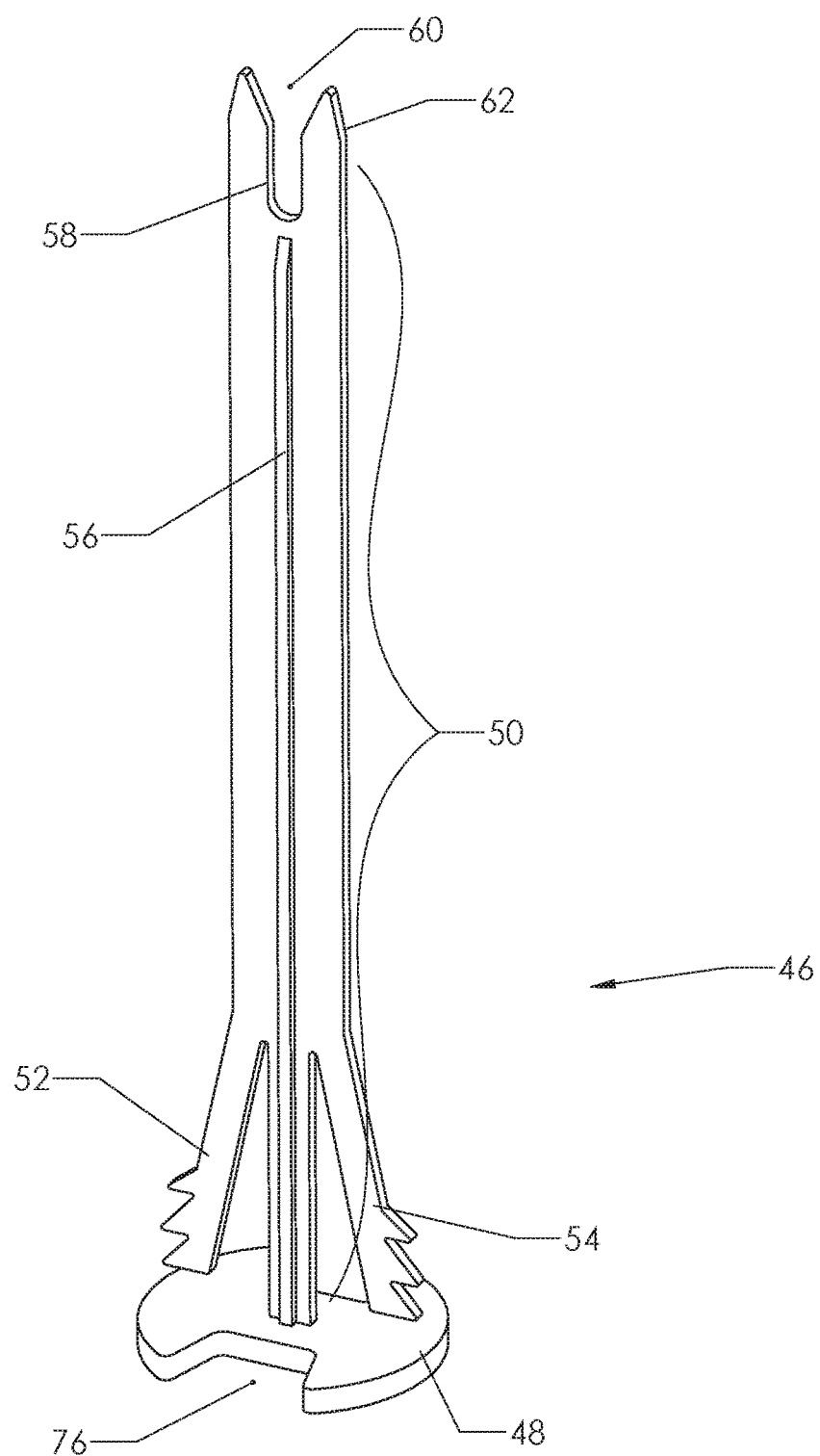
FIG. 6 is a perspective view, showing a preferred embodiment of the present invention.

FIG. 6 shows a preferred embodiment of the inventive device—wick retainer 46. The reader will observe how the device generally resembles a large nail. Head 48 is formed at a first end. Head 48 is generally planar. It also incorporates a pair of notches 76, with the two notches being on opposite sides of the head.

An elongated column 50 extends away from head 48. One or more ribs 56 are preferably provided to stiffen the column. The proximal end of the column is joined to head 48. The distal end of the column opens into expanding inlet 60. Retention notch 58 joins the narrower portion of expanding inlet 60. A chamfer 62 or other similar feature may be included on the outer edges of the column's distal end.

The proximal portion of the column includes a unidirectional latch. This is a feature configured to allow the wick retainer to be inserted through a hole into the plant pot but which resists its removal. In this version, the unidirectional latch comprises a first flex arm 52 and second flex arm 54. These include features configured to engage an opening in a plant pot. They allow the wick retainer to be secured within a wide range of hole sizes.

Figure 7:
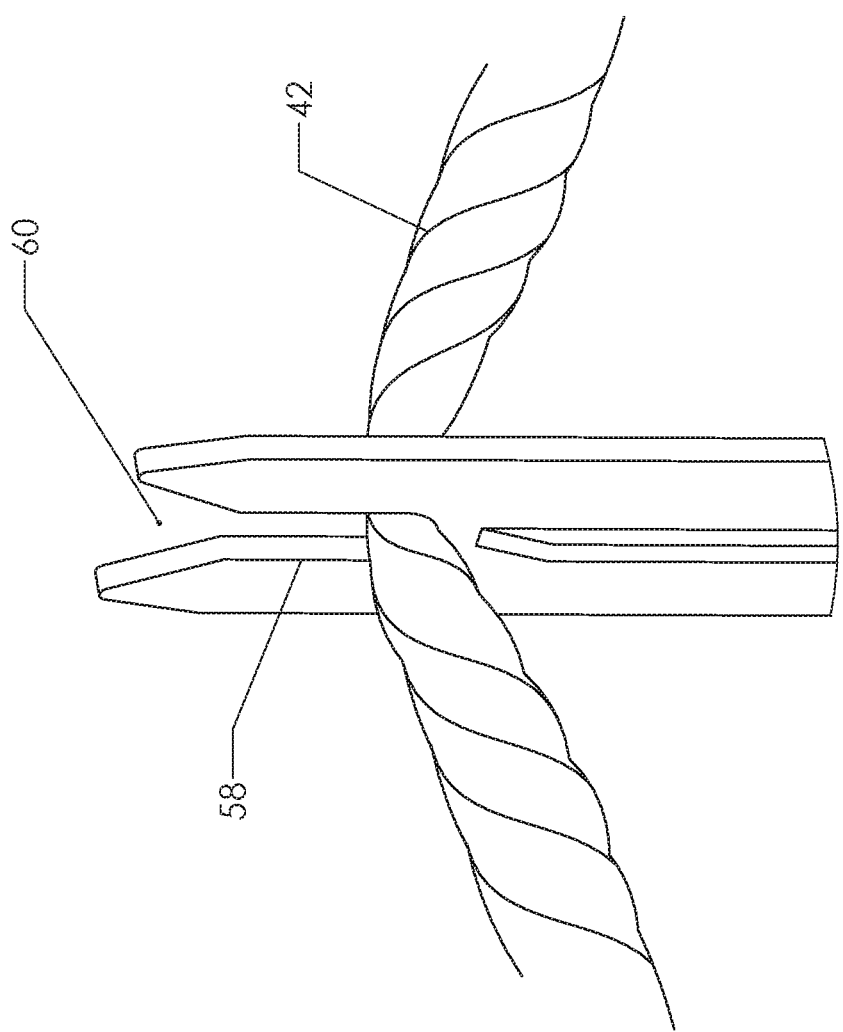
FIG. 7 is a detailed perspective view, showing how a wick may be secured in the retention notch of the inventive wick retainer.

FIG. 7 illustrates the operation of retention notch 58 on the distal end of wick retainer 46. Wick 42 is typically made from a wound or braided bundle of fibers. Such a bundle is easily compressible. The width of retention notch 58 is made narrower than the diameter of the wick. As an example, a common diameter for the wick is about 3.5 mm. The retention notch may be made about 1 to 1.5 mm wide. The user secures the wick to the wick retainer by placing the wick into expanding inlet 60 and then pulling the wick downward (with respect to the orientation shown in the view) so that the wick is compressed as it is pulled into retention notch 58. Frictional forces then tend to hold the wick in place.

Figure 8:
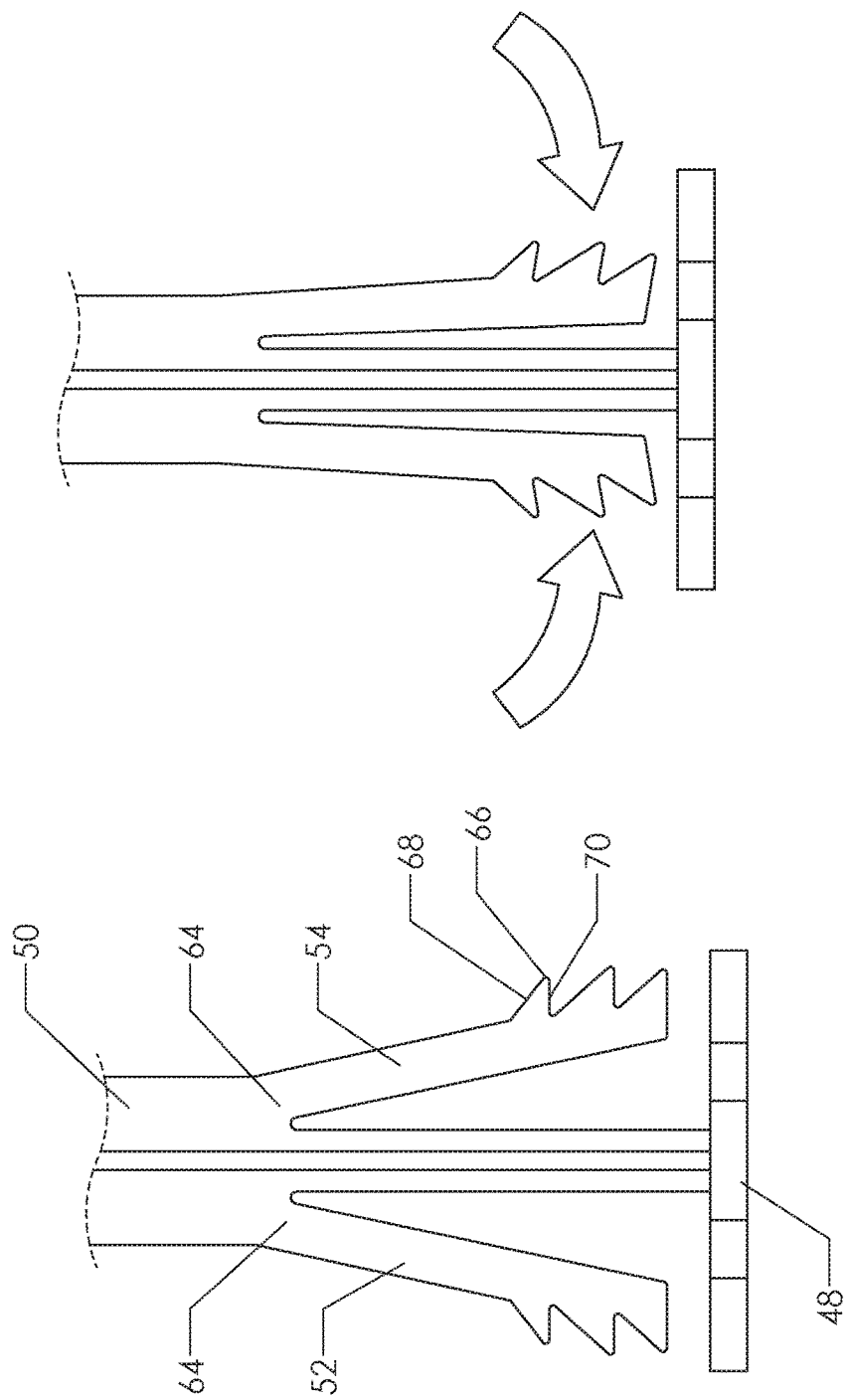
FIG. 8 is an elevation view, comparing the undeflected and deflected state of the flex arms.

FIG. 8 illustrates the operation of the two flex arms. The left view in FIG. 8 depicts first flex arm 52 and second flex arm 54 in an undeflected state. Both arms are joined to column 50 by a flexible joint 64. In fact, it is preferable to mold all these components as one unified piece. The outward-facing portions of each flex arm include an array of teeth 66. Each tooth includes a retention surface 70 facing toward head 48 and a tapered surface 68 on the opposite side.

The right view in FIG. 8 depicts the two flex arms when lateral compressive forces are applied (depicted by the arrows). Flexible joints 64 bend so that the two flex arms 52, 54 pivot inward against column 50. A thermoplastic polymer is preferably used to mold all features as a single, unified piece. The polymer is selected so that only elastic deformation occurs when the two flex arms are pressed inward as shown in the right view. In other words, if the compressive forces are released the two flex arms will spring outward.

Figure 9:
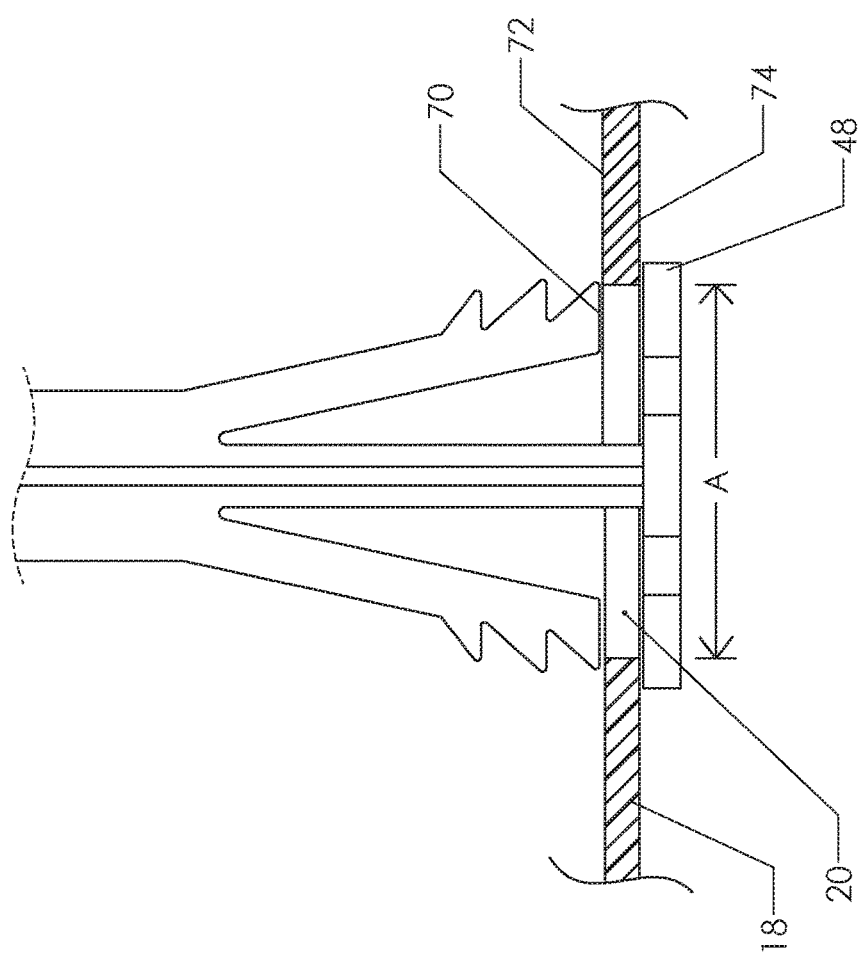
FIG. 9 is an elevation view, showing the wick retainer engaged to a relatively large hole in the bottom of a plant pot.
Figure 10:
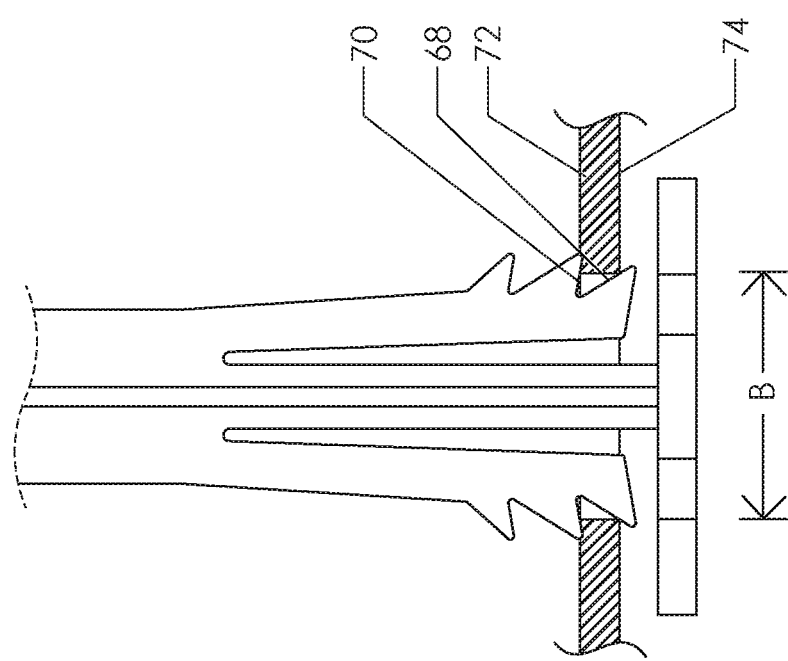
FIG. 10 is an elevation view, showing the wick retainer engaged to a relatively small hole in the bottom of a plant pot.

FIGS. 9 and 10 illustrate how the components of the wick retainer are configured to engage a hole in the bottom of a plant pot. FIG. 9 shows a plant pot having a fairly large hole 20. The column of the wick retainer has been pressed upward through the hole (typically by pressing upward on head 48). The hole has a diameter "A" that is just slightly smaller than the undeflected span of the two flex arms 52, 54. The tooth on each flex arm that is nearest the head has snapped over upper surface 72 of bottom 18. The tooth nearest the head will be called the "first tooth" with the next most distal example being the "second tooth" and so on. Retention surface 70 on each of the first teeth lies above upper surface 72 and will produce a mechanical interference if the wick retainer is moved downward. Head 48 lies below lower surface 74 and will produce a mechanical interference if the wick retainer is moved upward. Thus, the wick retainer is "trapped" in the desired position.

FIG. 10 shows the same wick retainer being inserted into another hole having a diameter "B." The reader will observe that "B" is much smaller than "A." In fact, an exemplary value for "A" would be 13 mm while an exemplary value for "B" would be 6.5 mm. In FIG. 10, the reader will observe that the plant pot bottom 18 is trapped between the first and second tooth on each of the flex arms. Retention surface 70 on the second tooth lies above upper surface 72 while tapered surface 68 on the first tooth lies below lower surface 74. The wick retainer is thereby again "trapped" in the desired position.

Tapered surfaces 68 and retention surfaces 70 on the teeth are configured to al low the user to push the wick retainer further into the pot but resist any motion tending to remove the wick retainer from the pot. In the configuration of FIG. 10 the presence of multiple teeth on each flex arm means that multiple teeth must work "backward" over the perimeter of the hole in order for the wick retainer to fall out. This is very unlikely.

Figure 11:
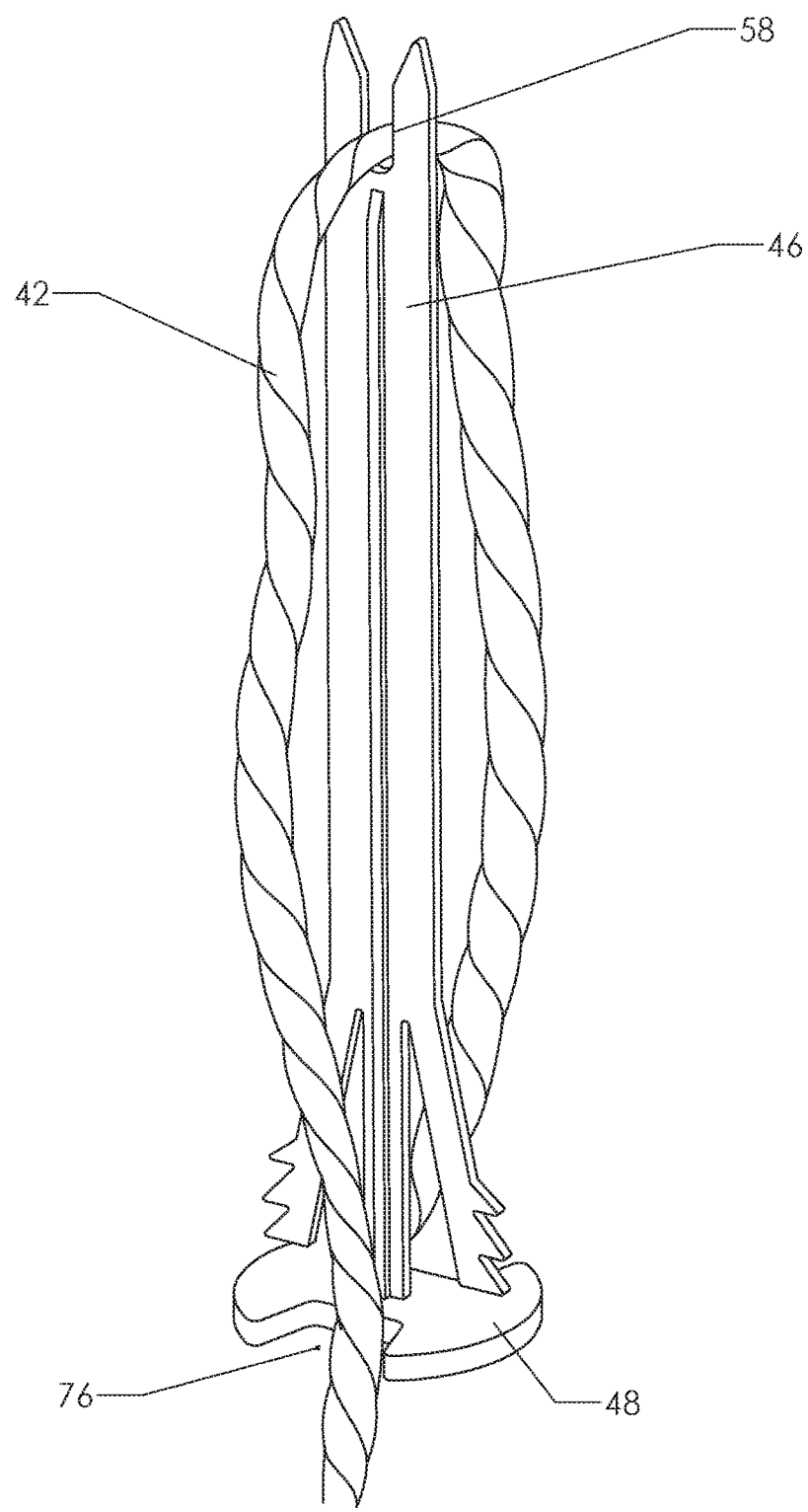
FIG. 11 is a perspective view, showing how a wick may be attached to the wick retainer with portions passing through notches in the wick retainer's head.

FIG. 11 illustrates more completely how the wick is connected to the wick retainer prior to insertion into the plant pot. A portion of wick 42 is pulled into retention notch 58 as explained previously. It is preferable (but by no means mandatory) to place the approximate mid-point of the wick into retention notch 58. The two free ends of the wick are then passed through the notches 76 in head 48. The notches in this case each form a receiver. They hold the free ends of the wick laterally and keep them from being pinched against the sides of the hole in the plant pot as the assembly is pressed into the plant pot.

Once the wick is in the position shown, the upward-extending portions of the assembly are pressed into the plant pot and the two flex arms secure wick retainer 46 to the plant pot. This insertion may be done before or after the plant and/or the growth media is added to the plant pot.

Figure 12:
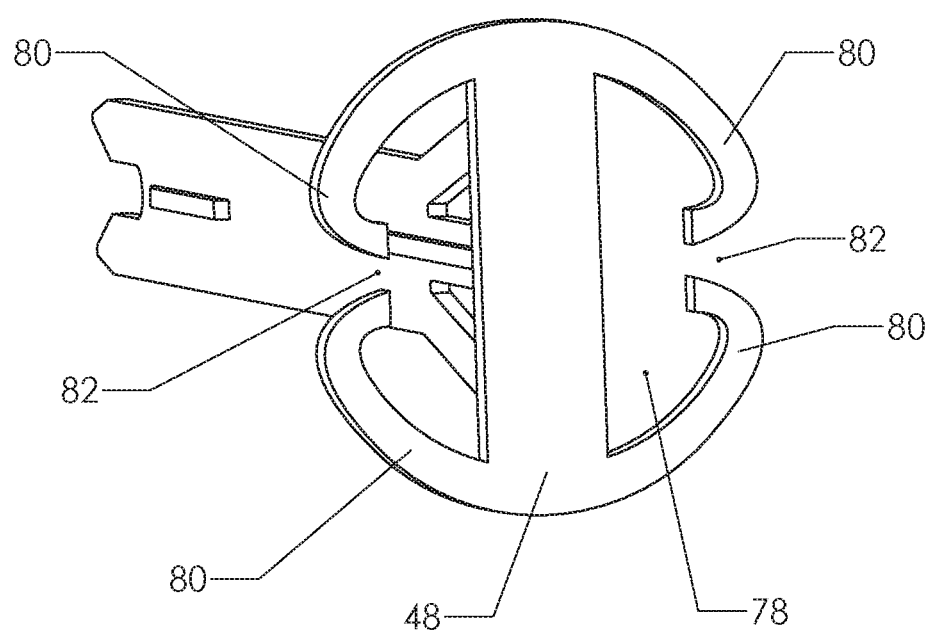
FIG. 12 is a detailed perspective view, showing an improved design for retaining the wick in the head of the wick retainer.
Figure 13:
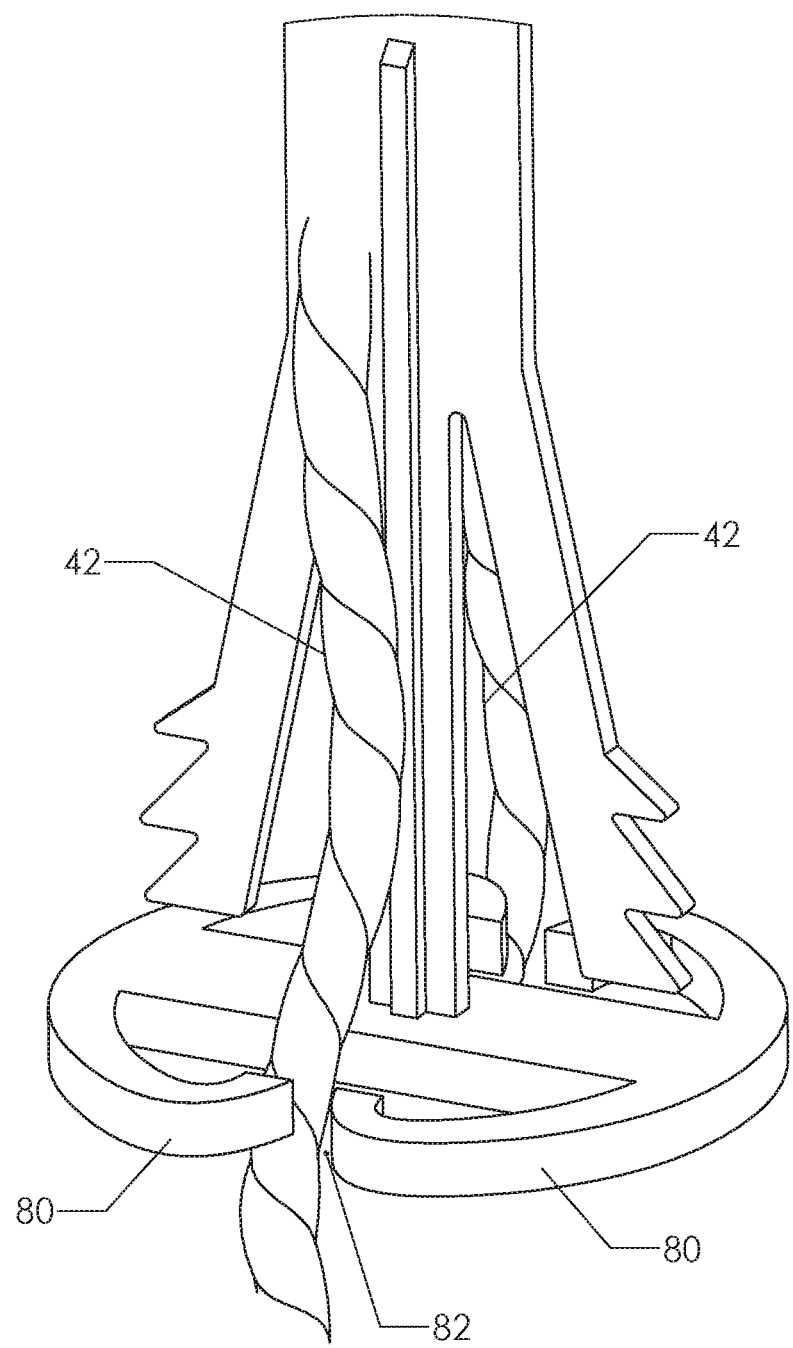
FIG. 13 is a detailed perspective view, showing how a wick is captured in the design of FIG. 12.

FIGS. 12 and 13 depict an additional embodiment including an improved structure for securing the wick to the head of the inventive device. In FIG. 12, the reader will observe that head 48 includes a receiver 78 on either side. Each receiver 78 is partially enclosed by a pair of encircling arms 80. The two encircling arms 80 do not quite meet in the middle—leaving gap 82. Preferably, gap 82 includes a tapered channel with the width of the channel decreasing as one proceeds from outside the encircling arms 80 and into the receiver 78. A length of a wick may be urged laterally through gap 82 and into receiver 78. Once within receiver 78, however, the wick will likely remain there. The width of the gap is preferably made smaller than the diameter of the wick. The encircling arms are preferably able to elastically deflect.

FIG. 13 shows a partial perspective view with wick 42 in position within the two receivers. In this view, one may easily see how wick 42 can be pushed through the gap 82 existing between the two encircling arms 80. As explained previously, the entire wick retainer is preferably molded as a single integral piece. A flexible polymer is preferably used. The flexible nature of the polymer allows the two encircling arms 80 to give somewhat as the wick is urged through gap 82. Once installed as shown in FIG. 13, the wick is secured in position and ready to be inserted into the plant pot.

The embodiments of FIGS. 12 and 13 offers a significant advantage in the proper insertion of the wick into the plant pot. There are known prior art wick retainers in which a wick is secured to the top of a column and a unidirectional latch is provided on the bottom end of the column. In these designs, the column (with the wick attached) is pushed through the hole and the unidirectional latch engages the hole and secures the assembly in place. In such designs the only portion of the wick that is secured to the wick retainer is the mid portion that is secured to the top of the column. During the insertion process, the free ends of the wick tend to drag across the edge of the hole and may pull the wick free from the wick retainer.

By the time the wick is pulled free of the wick retainer a portion of the wick retainer has already passed up and into the plant pot and the user can no longer see the engagement between the wick and the wick retainer. Thus, if the wick is dragged free of the engagement the user will often be unaware of this fact. The result is that although the wick retainer appears to be properly placed into the plant pot, the wick is lying within the lower portion of the soil and will not properly communicate the needed water.

The embodiment of FIGS. 12 and 13 overcomes this problem via the inclusion of one or more encircling arms 80 on head 48. Returning to FIG. 12, the reader will recall that a free end of the wick may be pressed through gap 82 so that it rests within receiver 78. The width of gap 82 is preferably made smaller than the diameter of the wick, so that once the wick is pressed into receiver 78 it cannot escape. It is preferable to provide two receivers 78 that that both free ends of the wick can be constrained.

Those skilled in the art will realize that a single encircling arm 80 could be used to create a gap 82 in conjunction with head 48. However, it is preferable to create the gap using two encircling arms 80 as shown. The arms are preferably molded from a flexible polymer and the use of two such arms provides additional flexibility for the insertion of the free end of the wick. The shape of the arms (with the narrowing approach to gap 82) provides a good unidirectional latch for the wick. The user may easily press the wick laterally through gap 82, but the wick cannot then escape without the exertion of considerable three.

In FIG. 13, the free end of the wick nearest the viewer has been pressed into its receiver through gap 82. The other end of the wick has not yet been pressed into its receiver but it is in position to be pressed into place. Once both ends of the wick are pressed into the receivers, the reader will appreciate that the wick is tucked in against column 50 and does not tend to snag the edges of the hole in the plant pot. This configuration greatly reduces the chance of the wick becoming separated from the wick retainer.

Other features and components may be combined with the inventive wick retainer. For example, it is known in the art to use solid "sticks" of fertilizer that may be inserted into a plant pot (usually by thrusting the stick downward into the top soil). A common example of such a product is the "Jobe's organic spike." Such fertilizer sticks combine the fertilizing ingredients with a soluble binder that holds them in a solid shape until the stick is exposed to moisture. They may be molded in almost any shape. One could add a spike to the top of the inventive wick retainer. A fertilizer stick could then be molded in the shape of a dome. The dome would include a receiver into which the spike on the wick retainer is inserted. Thus, a fertilizer dome would be added on the top of the assembly of the wick retainer and the wick. The entire assembly would then be inserted through the bottom of the plant pot.

The column of the wick retainer may be made in a wide variety of lengths to accommodate differing wick lengths and pot sizes. Likewise, the geometry of the flex arms can be varied to cover different ranges of hole sizes. Many other variations will occur to those skilled in the art.

Although the preceding description contains significant detail, it should not be construed as limiting the scope of the invention but rather as providing illustrations of the preferred embodiments of the invention. Those skilled in the art will be able to devise many other embodiments that carry out the present invention. For example, one could create an embodiment using only a single flex arm to accommodate the variation in hole sizes. Thus, the language ultimately drafted for the claims shall define the invention rather than the specific embodiments provided.

Having described our invention, we claim:

1. A wick retainer configured to insert and retain a wick in a hole through a plant pot, comprising:
    a. a wick having a central portion, a first free end, and a second free end;
    b. a column, having a first end and a second end;
    c. said first end of said column including a retention notch configured to engage said central portion of said wick;
    d. said second end of said column including a unidirectional latch configured to engage said hole and permit said wick retainer to be pushed into said plant pot but prevent said wick retainer from being pulled out of said plant pot, including,
        i. a first flex arm on a first lateral side of said column,
        ii. a second flex arm on a second and opposite lateral side of said column,
        iii. wherein each of said flex arms includes a plurality of teeth configured to engage a perimeter of said hole;
    e. said second end of said column including a head;
    f. a first encircling arm attached to said head;
    g. a second encircling arm attached to said head;
    h. a first gap between said first and second encircling arms leading to a first receiver that is wider than said first gap;
    i. a third encircling arm attached to said head;
    j. a fourth encircling arm attached to said head;
    k. a second gap between said third and fourth encircling arms leading to a second receiver that is wider than said second gap;
    l. said first free end of said wick lying within said first receiver; and
    m. said second free end of said wick lying in said second receiver.

2. The wick retainer as recited in claim 1, wherein:
    a. said first gap is tapered so that a width of said first gap decreases as one proceeds from outside said first receiver to inside said first receiver; and
    b. said second gap is tapered so that a width of said second gap decreases as one proceeds from outside said first receiver to inside said first receiver.

3. The wick retainer as recited in claim 2, wherein said first, second, third, and fourth encircling arms are flexible.

4. The wick retainer as recited in claim 1, wherein said unidirectional latch configured to engage said hole comprises a retention surface on each of said plurality of teeth configured to engage said perimeter of said hole, with said retention surface being parallel to a bottom of said plant pot.

5. A wick retainer configured to insert and retain a wick in a hole through a plant pot, said wick having a central portion, a first free end, and a second free end, comprising:
    a. a column, having a first end and a second end;
    b. said first end of said column including a retention notch configured to engage said central portion of said wick;
    c. said second end of said column including a unidirectional latch configured to engage said hole and permit said wick retainer to be pushed into said plant pot but prevent said wick retainer from being pulled out of said plant pot, including,
        i. a first flex arm on a first lateral side of said column,
        ii. a second flex arm on a second and opposite lateral side of said column,
        iii. wherein each of said flex arms includes a plurality of teeth configured to engage a perimeter of said hole;
    d. said second end of said column including a head having a first receiver configured to receive said first free end of said wick and a second receiver configured to receive said second free end of said wick;
    e. a first encircling arm attached to said head;
    f. a second encircling arm attached to said head;
    g. a first gap between said first and second encircling arms leading to a first receiver;
    h. a third encircling arm attached to said head;
    i. a fourth encircling arm attached to said head; and
    j. a second gap between said third and fourth encircling arms leading to a second receiver.

6. The wick retainer as recited in claim 5, wherein:
    a. said first gap is tapered so that a width of said first gap decreases as one proceeds from outside said first receiver to inside said first receiver; and
    b. said second gap is tapered so that a width of said second gap decreases as one proceeds from outside said first receiver to inside said first receiver.

7. The wick retainer as recited in claim 6, wherein said first, second, third, and fourth encircling arms are flexible.

8. The wick retainer as recited in claim 6, wherein said unidirectional latch configured to engage said hole comprises a retention surface on each of said plurality of teeth configured to engage said perimeter of said hole, with said retention surface being parallel to a bottom of said plant pot.

* * * * *